United States Patent [19]

Raschke

[11] 4,326,206

[45] Apr. 20, 1982

[54] METHOD OF REDUCING CROSS TALK IN INK JET ARRAYS

[75] Inventor: Curt R. Raschke, Dallas, Tex.

[73] Assignee: Xerox Corporation, Stamford, Conn.

[21] Appl. No.: 164,479

[22] Filed: Jun. 30, 1980

[51] Int. Cl.³ .............................................. G01D 15/18

[52] U.S. Cl. .............................................. 346/140 R

[58] Field of Search .............................. 346/140 PD

[56] References Cited

U.S. PATENT DOCUMENTS

| | | | |
|---|---|---|---|
| 4,057,807 | 11/1977 | Fischbeck et al. | 346/140 R |
| 4,115,789 | 9/1978 | Fischbeck | 346/140 R |
| 4,121,227 | 10/1978 | Fischbeck et al. | 346/140 PD |
| 4,215,354 | 7/1980 | Larsson | 346/140 PD |
| 4,216,477 | 8/1980 | Matsuda et al. | 346/140 PD |
| 4,243,995 | 1/1981 | Wright et al. | 346/140 PD |
| 4,251,823 | 2/1981 | Sagae | 346/140 PD |

FOREIGN PATENT DOCUMENTS 2700010 7/1977 Fed. Rep. of Germany .

*Primary Examiner*—George H. Miller, Jr.
*Attorney, Agent, or Firm*—Richard A. Tomlin

[57] ABSTRACT

A method of minimizing cross talk between transducer driven pulse ejectors in an array. The drive pulse to the transducer is optimized specifically by selection of a preferred pulse width.

2 Claims, 4 Drawing Figures

METHOD OF REDUCING CROSS TALK IN INK JET ARRAYS

The invention relates in general to pulsed liquid droplet ejecting systems wherein an electrical pulse is applied to a transducer to eject droplets and particularly to systems in which closely spaced arrays of droplet ejecting jets are used. Specifically, the invention relates to a method for minimizing "cross talk" between jets in an array by controlling the pulse width of the input or drive pulse to the transducer that causes droplet ejection.

In pulsed liquid droplet ejecting systems, such as an ink jet printer, transducers are used to cause expulsion of ink as droplets from a small nozzle. An array of such jets is often utilized in high-speed, high-resolution printers. As is well known, the rate of printing and the resolution of the printed image depends on the number of such jets and their spacing. The closer the jets are to each other in general, the faster the images can be produced and with higher image resolution. It has been found, however, that, when the jets are very close to one another in an array, the response of one jet to its drive pulse can be affected by whether other jets located nearby in the same array are also operating. It has been found that this "cross talk" can be minimized by careful selection of the drive pulse waveshape, which is used to trigger the driving transducer.

The advantages of the present invention will be better understood on consideration of the following description, particularly when it is taken in conjuction with the following drawing wherein.

Figure 1:
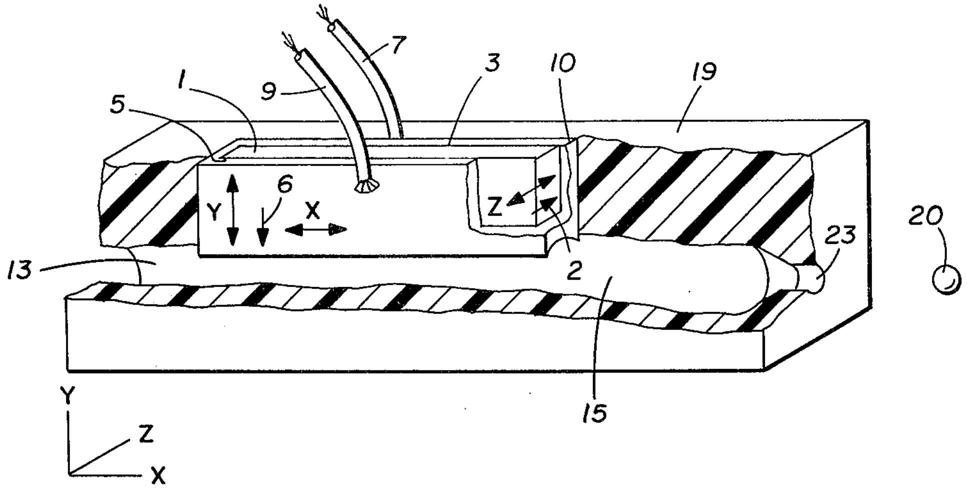
FIG. 1 is a cross-sectional perspective representation of an embodiment of an ink jet ejector in which the present invention may be utilized.
Figure 2:
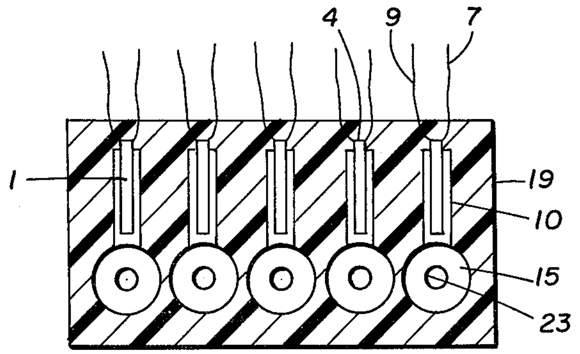
FIG. 2 is a cross-sectional end view of an array of ejectors utilizing the embodiment of FIG. 1.

Referring now to FIGS. 1 and 2, there is shown piezoelectric transducer member 1. Piezoelectric member 1 is coated on surfaces 3 and 5 with a conductive material. An electric voltage pulse generator (not shown) is connected to conductive surfaces 3 and 5 by electrical lead wires 7 and 9. Piezoelectric member 1 is polarized in the Z dimension, direction 2, during manufacture so that application of a drive pulse or electric field in a direction opposite to the polarization direction, direction 2, causes piezoelectric member 1 to contract in the Z dimension. That is, the piezoelectric transducer 1 becomes thinner in the Z dimension. When this occurs, piezoelectric member 1 expands or extends in both the X and Y dimensions. The planar movement of the ends and edges of the rectangular piezoelectric member 1, away from the center of piezoelectric member 1, is referred to herein as in-plane extensional movement. The piezoelectric member 1 is extended in the X and Y directions when excited by electric drive voltage pulses applied between electrical leads 7 and 9. Typically, potential applications of about 50 volts at a frequency of about 8 kilohertz have been found useful in a printer environment. Typically, the pulse width or length of time the drive voltage is applied to the piezoelectric member is about 20 microseconds. The upper edge 4 (see FIG. 2) of piezoelectric transducer 1 is held rigidly in place by encapsulating material 19. The Y dimension expansion of piezoelectric member 1 can, therefore, cause extensional Y dimension movement only in a direction shown by arrow 6 (see FIG. 1) away from rigid material 19 and down into channel 15. The piezoelectric member 1 of this invention is coated with a material 10, which is typically a flexible insulating compound capable of providing shear relief between piezoelectric member 1 and relatively rigid encapsulating material 19. The Y directional movement of piezoelectric member 1 towards ink chamber 15 causes sufficient buildup of pressure in ink 13 to expel a drop 20 from orifice 23. Typically, using conventional inks where a 0.25 mm thick by 5 mm high by 15 mm long piezoelectric member 1 acts on an ink channel 15 measuring 0.75 mm in diameter and tapering to an orifice 23 of about 50 micrometers, the velocity with which drop 20 is ejected is about 2 meters/second. It has been found that the velocity with which drop 20 is ejected depends on whether any other of the nearby piezoelectric members 1 is also being pulsed. For example, it has been found with jet spacings of about 50 mils, i.e., the channels 15 are on 50 mil centers, that where adjacent jets are fired, the velocity of drops 20 may be increased by as much as 10%. Where three side-by-side jets are fired, the increase in drop velocity can be as much as 20% for each jet. The velocity of drops 20 can be affected by other jets operating at distances several jets away. This variation in drop velocity is sufficient to affect drop placement where the marking device and the object to be marked are moving relative to each other. This drop placement error can appreciably deteriorate the quality of image produced. It is believed the velocity difference or perturbation is caused by a shock wave set up in encapsulating material 19 by the flexing of the piezoelectric member 1, which shock wave is transmitted to other ink channels 15. That is, not only is energy directed into the ink 13 by piezoelectric member 1, it is also directed into encapsulating material 19. The energy is thus transmitted through encapsulating material 19 to other jets adding to the energy focused into their ink channels 15, which additional energy adds to the ink jet droplet velocity. One solution to the problem would be to space the jets further apart so that the shock wave energy would be dissipated within the encapsulating material 19 before it could reach nearby jets. As stated above, this would, of course, deleteriously affect the rate and resolution of image formation. A more useful solution has been discovered and is the subject of this invention. It has been found unexpectedly that an optimum pulse width range exists at which the amount of drop velocity perturbation due to energy transfer within the encapsulating material 19 is minimized. The reason for the existence of an optimum pulse width is not understood. The following facts are, however, known.

Figure 3:
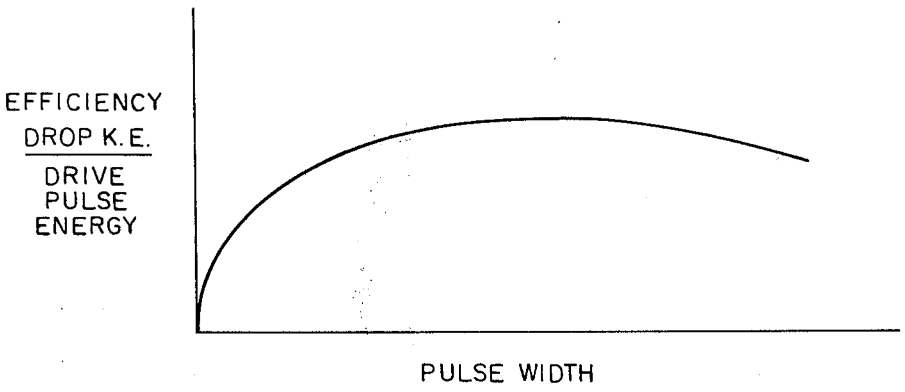
FIG. 3 is a graph showing the relationship between efficiency and drive pulse width for a pulse ejector.

It is known that, in a given ink jet pulse ejector where a very narrow drive pulse width is used, virtually all of the energy directed into channel 15 by the Y dimension expansion of piezoelectric member 1 goes into expanding the walls of channel 15 as there is insufficient time for the stored energy to pressurize the meniscus in the nozzle. At slightly wider drive pulse widths, more time is allowed for the energy to propagate the nozzle and to expand the ink 13 meniscus in nozzle 23, and likewise some energy is transmitted back through the ink 13 toward the ink supply (not shown). When the pulse width is increased further, more of the stored energy is allowed to be used in developing drop 20 kinetic energy which, as is well known, can be represented by the term $\frac{1}{2}mv^2$, where m is the mass, and v is the velocity of the droplet, respectively. A graph can be drawn (see FIG. 3) plotting the efficiency of the droplet ejecting device in terms of the energy contained by the drop, $\frac{1}{2}mv^2$, divided by the energy contained in the piezoelectric member drive pulse against the pulse width. It is found that this efficiency increases with pulse width to a point and then levels off before again dropping. It has been found that the pulse width at which minimum drop velocity perturbation occurs corresponds with the pulse width for maximum efficiency. It is speculated that, when the ejector is operating at peak efficiency, for that reason alone it is more difficult to alter its response. That is, perturbation of an efficiently operating pulse jet ejector is inherently more difficult than a pulse jet not operating efficiently.

Figure 4:
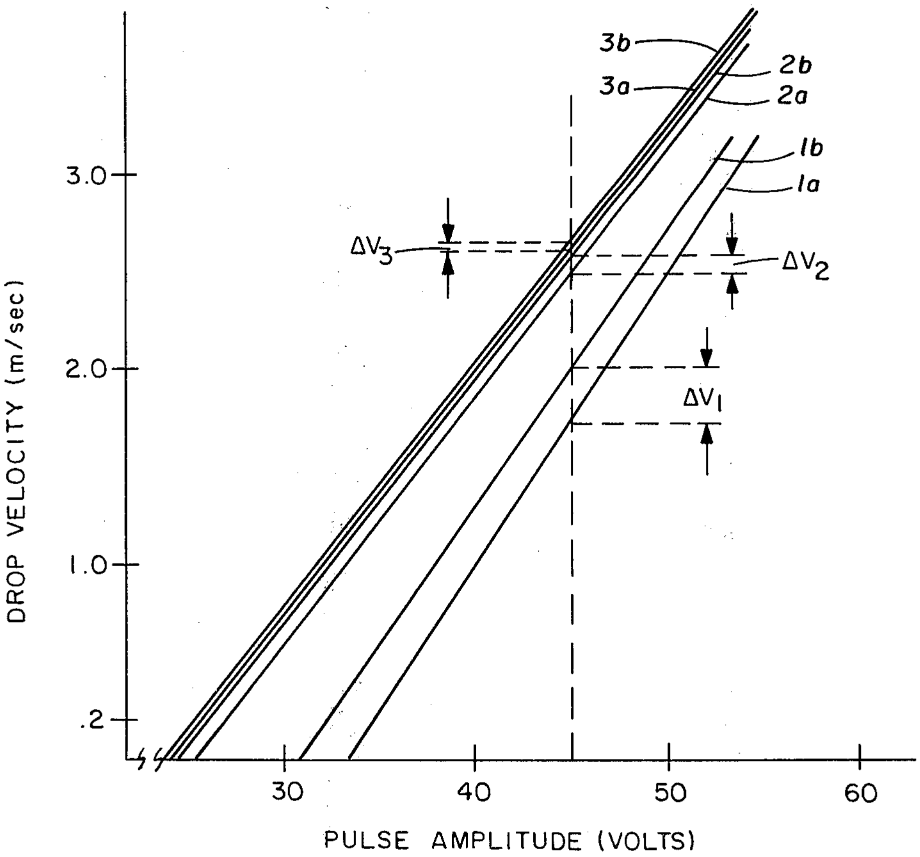
FIG. 4 is a graph showing the effect of varying drive voltage pulse waveshapes on jet response for jets operating independently or with another jet.

Referring now to FIG. 4, there is shown a graph demonstrating the improved results obtained using the present invention. Line 1*a* is a plot of the velocity of a droplet ejected at different drive pulse amplitudes at a drive pulse width of 20 microseconds. Line 1*b* shows the droplet velocity where an adjacent jet (in this case the adjacent jets were on 64 mil centers) is pulsed at the same time as the measured jet. The difference in the two lines $\Delta V_1$ at a given pulse amplitude is the amount of drop perturbation caused by transmittal of the shock wave through the encapsulating material 19 and into the ink 13 in ink channel 15. Line 2*a* represents the plot of drop velocity versus drive voltage using a 40 microsecond pulse width. Line 2*b* is the same plot but with the adjacent jet again operating simultaneously with the measured jet. It can be seen that $\Delta V_2$ is smaller than $\Delta V_1$ demonstrating that the perturbation in drop velocity due to adjacent jet operation is less at a 40 microsecond pulse width than at a 20 microsecond pulse width. Similarly, lines 3*a* and 3*b* demonstrate operation at a 60 microsecond pulse width with and without adjacent jet operation, respectively. Again, an improvement is seen. It should be pointed out that it is possible that for some systems the $\Delta V$ shown for the 40 microsecond pulse width may be acceptable. Further, considering that at 8 kilohertz operation the jet can be driven at 125 microsecond intervals, there is a practical upper limit to pulse width, particularly when one considers that a certain amount of time is required, for example, for droplet formation, ink channel 15 refill and meniscus stabilization. However, by utilizing the principle of this invention, an optimum drive pulse width may be found.

It should be pointed out here that the kind of cross talk referred to herein is not the same as that interference referred to as "cross-coupling" where the pressure pulse in one ink jet channel is transmitted by the ink 13 to another jet causing spurious jet operation. A discussion of cross-coupling appears, for example, in U.S. patent application Ser. No. 963,475, filed in the U.S.

Patent and Trademark Office on Nov. 24, 1978, now U.S. Pat. No. 4,215,354.

Although specific embodiments have been described above, modifications can be made to the present invention and yet be included within the scope of the present invention. For example, the displacement devices, instead of being piezoelectric crystals, could be magnetostrictive, electromagnetic or electrostatic transducers. Further, although the specification has been addressed primarily to an ink jet printing system, the invention is applicable to any pressure pulse drop ejector.

What is claimed is:

1. A method of operating an array of pulsed droplet ejectors which comprises:

(a) determining the velocity of ink droplets ejected from a first selected ejector in the ejector array when said first ejector is operated alone at a first preset drive pulse width;

(b) determining the velocity of ink droplets ejected from said first selected ejector when at least one adjacent ejector is operated at the same time as said first ejector, said ejectors being driven by a drive pulse of the same width as said first preset drive pulse width;

(c) determining the difference in droplet velocities obtained from steps (a) and (b);

(d) selecting a drive pulse having a different pulse width than previously used in steps (a)-(c) and repeating steps (a)-(c) using said different pulse width;

(e) repeating steps (a)-(d) a sufficient number of times until a drive pulse width can be selected that provides acceptable image quality both when said first ejector is operated alone and when said first ejector is operated at the same time as adjacent ejectors; and (f) operating an ejector array using a drive pulse having the drive pulse width selected in step (e).

2. A method of optimizing ejection from an array of pulsed droplet ejectors which comprises:

(a) determining the velocity of ink droplets ejected from a first selected ejector in the ejector array when said first ejector is operated alone at a first preset drive pulse width;

(b) determining the velocity of ink droplets ejected from said first selected ejector when at least one adjacent ejector is operated at the same time as said first ejector, said ejectors being driven by a drive pulse of the same width as said first preset drive pulse width;

(c) determining the difference in droplet velocities obtained from steps (a) and (b);

(d) selecting a drive pulse having a different pulse width than previously used in steps (a)-(c) and repeating steps (a)-(c) using said different pulse width; and (e) repeating steps (a)-(d) a sufficient number of times until an optimum drive pulse width can be determined.

* * * * *